Aug. 31, 1926.

R. D. PIKE 1,598,308

METHOD OF AND APPARATUS FOR FINING GLASS

Filed Nov. 1, 1922     2 Sheets-Sheet 1

INVENTOR.
Robert D. Pike
BY
ATTORNEYS.

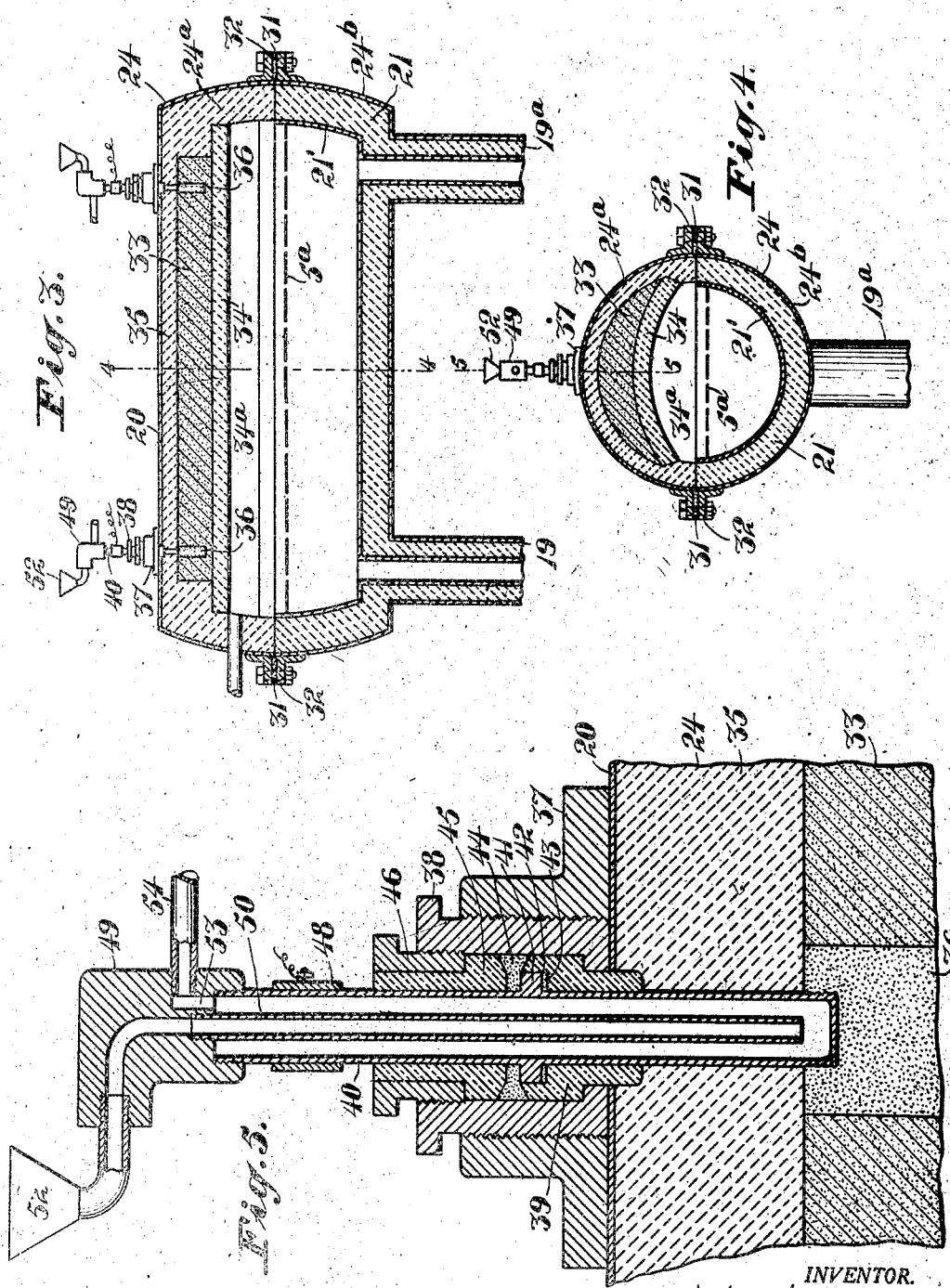

Patented Aug. 31, 1926.

1,598,308

UNITED STATES PATENT OFFICE.

ROBERT D. PIKE, OF SAN FRANCISCO, CALIFORNIA, ASSIGNOR TO COLE-FRENCH COMPANY, A CORPORATION.

METHOD OF AND APPARATUS FOR FINING GLASS.

Application filed November 1, 1922. Serial No. 598,285.

This invention relates to fining of glass; and has for its object to facilitate the removal of gaseous products of decomposition and other volatile impurities. This object I accomplish by the employment of vacuum or suction acting upon the melted glass, either within the furnace or within a separate fining compartment.

One form which my invention may assume is exemplified in the following description and illustrated in the accompanying drawings, in which—

Fig. 3 shows a vertical, central, sectional view of a vacuum chamber fitted with electrical heating means.

Fig. 4 shows a cross section of the same, taken on the line 4—4 of Fig. 3.

Fig. 5 shows a cross sectional view, taken on the line 5—5 of Fig. 3.

Figure 2:
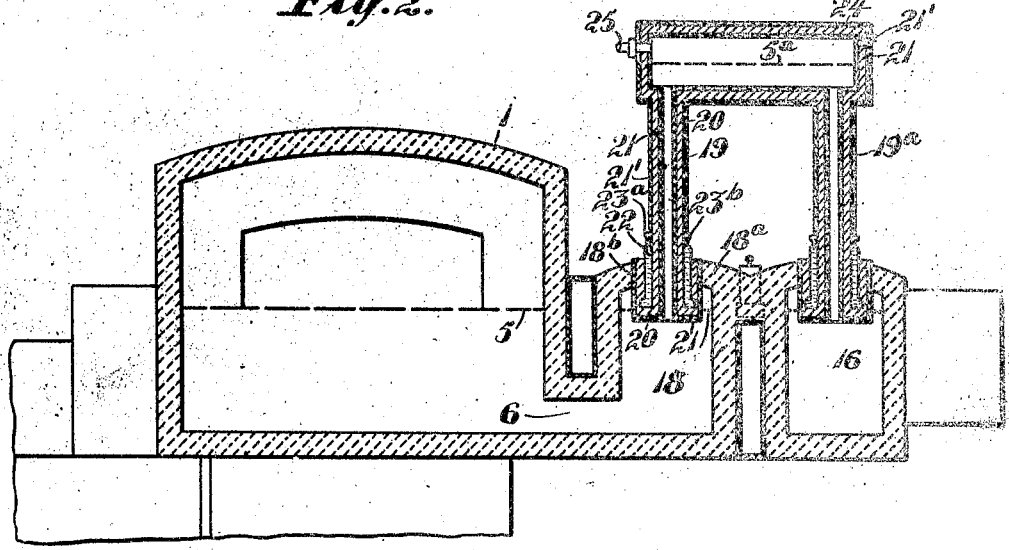
Fig. 2 shows a vertical, central, sectional view.
Figure 1:
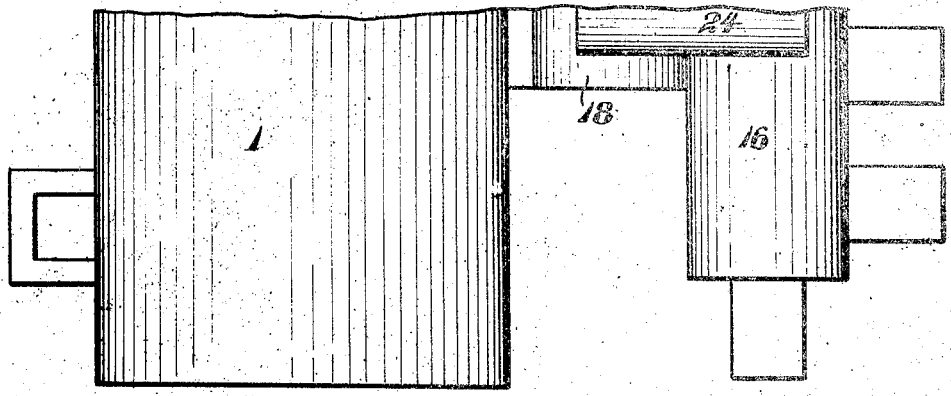
Fig. 1 shows a plan view of an apparatus embodying my invention.

The glass leaving the melting furnace 1 flows through the submerged port 6 into a compartment 18 having a roof 18ª with a central hole 18ᵇ. Through the hole 18ᵇ projects a suction pipe 19, composed of gastight steel sheeting 20 and lined on the inside with refractory and insulating material 21, faced with a dense porcelain-like lining 21′.

At the lower end of the suction pipe is a water jacket 22 with a supply pipe 23ª and outlet pipes 23ᵇ. The outer surface of the water jacket is protected by refractory and insulating lining 21 and a porcelain-like lining 21′. The pipe 19 is dipped into the glass until the glass level 5 is a little above the level of the bottom of the water jacket 22. The upper end of the pipe 19 terminates in a vacuum chamber 24, which is also lined with refractory and insulating lining 21 and porcelain lining 21′ and is connected through a pipe 25 to any suitable source of vacuum. The word "vacuum" is used relatively, the pressure being automatically retained at such a point that the glass holds a more or less permanent level 5ª within the vacuum chamber 24. It will be understood that the reduced pressure in 24 causes the molten glass to rise in the pipe 19 and partly fill the chamber 24. If the vacuum in chamber 24 be practically perfect, the difference in level between 5ª and 5 will be about 10′.

A pipe 19ª, similar to the suction pipe 19, projects through the roof of the working compartment 16 and dips into the glass therein a little deeper than 19 dips into the glass in compartment 18.

In operation, a steady reduced pressure is maintained in the chamber 24 by any suitable automatic means used to control a vacuum pump of suitable capacity. As the glass is removed from the working compartment 16, the level therein is lowered. This results in a flow downwardly through 19ª and a corresponding flow upwardly through 19. But as the glass passes up through pipe 19 and through vacuum chamber 24, the reduced pressure causes it to give up a large portion of its dissolved and absorbed gases, so that when the glass descends into the working compartment 16, it is fined and read for working.

In passing through the vacuum compartment 24 and the pipes 19 and 19ª, there will be a certain loss of temperature in the glass. This may be counteracted in any suitable fashion, as, for example, by the use of insulating brick 21 between the refractory porcelain-like lining 21′ and the steel shell 20; by heating the glass by any suitable means in passing through the chamber 24; or by heating the glass by any suitable means while in the working compartment 16.

The entire vacuum compartment can be lifted by crane and replaced by a new one, should the lining wear out or for any other reason. Before placing fresh vacuum apparatus in place, it should be heated internally to the approximate temperature of the glass. This can be done by firing fuel into it through either one of the pipes 19 or 19ª, or through any other suitable opening.

A method of heating the glass electrically while passing through the vacuum is shown in Figs. 3 to 5, inclusive. For this purpose the vacuum refining chamber 24 is divided into two parts, the upper part 24ª and the lower part 24ᵇ; the two being joined together when in use by means of an air-tight joint 31, which may be of any suitable construction. This latter joint will be useful, whether electrical heating be employed or not, to open up the apparatus and permit of placing or repairing the lining. The latter is held firmly in place in the respective halves by the flanges 32.

In practice, the porcelain lining 21' can be cast in place by well known methods; and then dried and fired in place by electrical heat; the part of the lining in the lower half of 24 being heated by the electrical resistor in the upper half and the lining in the pipes 19 and 19ª being heated by special electrical resistors provided for the purpose. By this means an exceedingly durable lining, free from joints, can be provided, and at the same time excessive heat losses can be prevented by the use of a refractory insulating brick 21.

The electrical resistor for supplying heat to keep up the temperature of the glass being fined to any desired point is provided by a carbon resistor 33 placed in the upper half of the fining chamber 34ª. It will be noted that this resistor is so placed that the general cylindrical shape of the chamber 24 is not altered. The resistor is supported from below by the arch 34 which is preferably made of a highly refractory and highly heat conductive substance, as, for example, magnesite bricks, and is separated from the steel shell on its upper face by the refractory and insulating lining 35. The electrical current, usually alternating, is conducted to the carbon resistor through the graphite electrodes 36.

It is necessary to conduct the electrical current through the steel shell 20 without coming into electrical contact with same, and at the same time providing an air-tight joint. This may be accomplished by the following means:

A steel pad 37 is welded on to the steel shell 20, and a threaded hole tapped through, into which is screwed the bushing 38. Into this is fitted the porcelain bushing 39, which rests on a shoulder at the lower extremity of the bushing 38 and is preferably cemented into place. The copper tube 40, having a sealed and threaded lower extremity, passes through the bushing 39, and the copper shoulder 41 rests in a recess 42 and is separated from the porcelain by airtight gasket 43. The copper tube 40 is screwed into a threaded hole in the graphite electrode 36, thus making an electrical connection with the latter.

A special shaped gasket or packing 44 rests on top of the ring 41 and the bushing 39, and on top of this latter packing rests the porcelain bushing 45; the latter being screwed up tight by the gland 46. Electrical lead wire is attached to the tube 40 by clamps 48. A brass fitting 49 has screwed into it a copper tube 50, communicating with a passage which, in turn, communicates with a water supply funnel 52. When the fitting 49 is screwed into place, the lower end of the tube 50 is close to the sealed bottom of the tube 40. The fitting 49 is also supplied with an outlet duct 53.

As a result of this arrangement, water poured into the funnel 52 circulates through the copper tube 40, keeping the same cool and discharging through any suitable pipe 54.

It is thus seen that the above described arrangement provides for the passage of an electrical current into the interior of a chamber 24 without destroying the vacuum which is maintained therein, and which current passing through the granular carbon resistor 33, heats same, which heat is transferred by radiation and conduction through arched roof 34 to the glass which is in the process of being fined.

By virtue of this arrangement and by maintaining the glass in the vessel 18 at a suitably elevated temperature, there will never be any danger of the glass, which flows through the vacuum finer, becoming cooler than a certain prescribed limit, set by the amount of current passing through the granular carbon resistor, and this will hold whether much or little glass is flowing through the finer.

By the employment of a reduced pressure or vacuum, the fining of the glass is greatly facilitated. The vacuum removes not only the gases of decomposition but other volatile impurities and any dissolved or adsorbed gases, thus producing a glass of great soundness and uniformity.

The maximum effect of the vacuum is realized by subjecting the molten glass to its action for at least one-half hour, and by applying the vacuum gradually. I accomplish the former by making the vacuum chamber of proper size, so that the glass remains therein at least one-half hour; and the latter is inherent in my apparatus inasmuch as the vacuum is applied gradually to the glass as it flows upwardly through the suction pipe into the vacuum chamber.

Various changes in the construction and arrangement of the several parts herein shown may be employed without departing from the spirit of my invention as claimed.

I claim:

1. A method of fining glass, which consists in passing the melted glass through a vacuum chamber and applying heat to said chamber to maintain the temperature of the glass.

2. A method of fining glass, which consists in passing the melted glass through a vacuum chamber and heating the chamber electrically.

3. The combination with a glass tank furnace, of a vacuum chamber connected therewith and through which the glass is passed for the purpose of fining, and electrical heating means to maintain the temperature of the glass while passing through said chamber.

4. The combination with a glass tank furnace and a working chamber, of a vacuum chamber arranged between the furnace and working chamber and through which the glass is passed to subject it to a fining action, and electrical heating means arranged within said vacuum chamber to maintain the temperature of the glass.

5. In combination with a glass tank furnace, a fining device for glass comprising a vacuum chamber arranged above the level of the glass, a pipe leading from the furnace into one end of said chamber, a working chamber connected with the opposite end of the vacuum chamber, and electrical heating means arranged within said vacuum chamber to maintain the temperature of the glass.

ROBERT D. PIKE.